F. MOYLE.
PNEUMATIC SAFETY VALVE.
APPLICATION FILED JAN. 18, 1909.
948,469.
Patented Feb. 8, 1910.
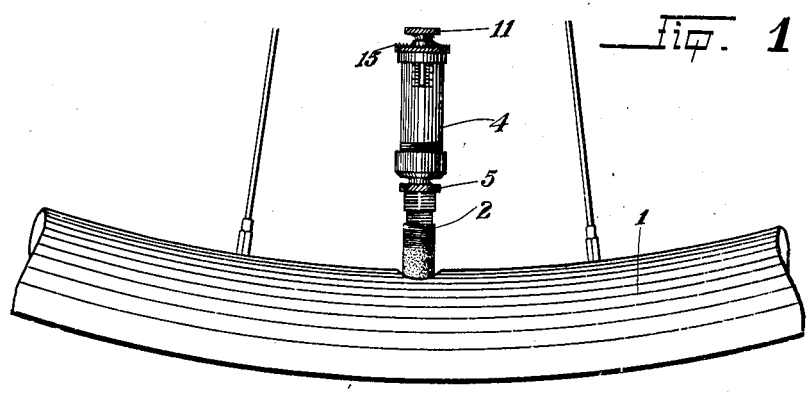
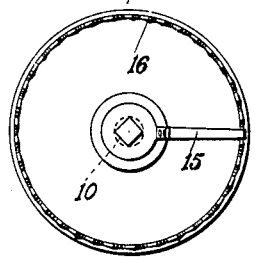
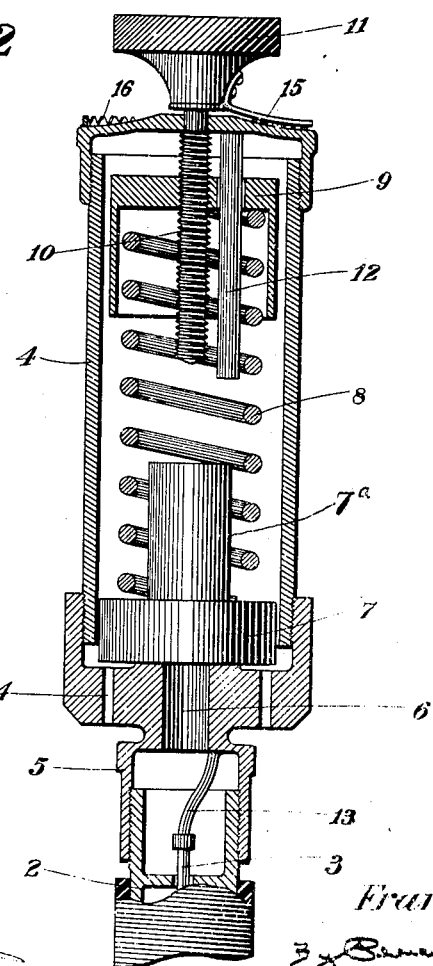
Witnesses
Inventor
Frank Moyle

UNITED STATES PATENT OFFICE.

FRANK MOYLE, OF JAMESTOWN, CALIFORNIA.

PNEUMATIC SAFETY-VALVE.

948,469.

Specification of Letters Patent.

Patented Feb. 8, 1910.

Application filed January 18, 1909. Serial No. 472,871.

*To all whom it may concern:*

Be it known that I, FRANK MOYLE, a citizen of the United States, residing at Jamestown, in the county of Tuolumne, State of California, have invented certain new and useful Improvements in Pneumatic Safety-Valves; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in pneumatic valves, such as used on bicycle or automobile tires, the object of the invention being particularly to produce a safety escape means whereby the air within the tire will be automatically relieved when expanded by heat or other cause, thus relieving the interior strain and preventing bursting or tearing of the tires.

A further object of the invention is to produce a simple and inexpensive device for the purpose and one which can be readily fitted upon any form of ordinary valve now used on the tires.

These objects I accomplish by means of a tube adapted to screw onto the tube of the valve in place of the cap, said first named tube having a spring controlled valve fitted over the air outlet communicating with the said second named tube to relieve the excess air therefrom when expansion occurs, such spring being of sufficient tension to maintain the normal air pressure in the tires. I also employ such other and further structure and relative arrangement of parts as will more fully appear by a perusal of the following specification and claims.

In the drawings similar characters of reference indicate corresponding parts in the several views.

Figure 1 is a fragmentary view of a tire showing my improved safety valve installed thereon. Fig. 2 is a vertical section of my improved valve. Fig. 3 is a top plan view of the valve.

Referring now more particularly to the characters of reference on the drawings 1 designates the rim and 2 the usual valve tube thereon having the usual relief pin 3.

4 is a tube having a sleeve 5 adapted to screw onto the tube 2 there being a port 6 communicating from the tube 2 into the tube 4 over which port 6 is seated a valve 7 there being a spring 8 interposed between said valve 7 and a cap 9 screw mounted on a threaded pin 10 operated by a thumb screw cap 11 on the outside of the tube 4, the cap 9 being prevented from rotary movement by means of a pin 12 projecting downward from the top of the tube 4 through said cap 9.

When the tire 1 is pumped up, the sleeve 5 is screwed onto the tube 2, a pin 13 therein engaging the relief pin 3 and permitting the air pressure to pass through the port 6 against the valve 7, the spring 8 being of sufficient tension to hold the normal pressure of the air, but when the same becomes expanded with heat or other cause, the added pressure raises the valve 7 and permits the excess air to escape through atmospheric ports 14 in the tube 4. The tension of the spring 8 is decreased or increased by screwing the cap 9 up or down on the pin 10 thus permitting accurate adjustment in all respects for its proper functions. The valve 7 has a shank 7$^a$ extending upward into the spring 8 to hold said spring in proper position. To prevent the member 9 from being moved accidentally I provide a circular ratchet rack 16 on the top of the tube 4 engageable with which is a spring 15 secured to the member 11 to hold such member against any undesired movement.

From the foregoing description it will be readily seen that I have produced such a valve as substantially fulfils the objects of the invention as set forth herein.

While this specification sets forth in detail the present and preferred construction of my device, still in practice such deviations from such detail may be resorted to as do not form a departure from the spirit of the invention.

Having thus described the invention what I claim as new and useful and desire to secure by Letters Patent is:—

1. A pneumatic valve comprising a tube having a port in its lower end and atmospheric ports, an air valve communicating with said port, a valve seated over said port, a turnable pin in the top of said tube, a cap movable on said pin, a rigid pin in said tube projecting through said cap and a spring interposed between said last named valve and said cap.

2. A pneumatic valve comprising a tube having a port in its lower end and atmospheric ports, an air valve communicating with said port, a valve seated over said port, a turnable pin in the top of said tube, a cap movable on said pin, a finger piece on said pin outside of said tube, a ratchet rack on the top of said tube, a spring clip member on said finger member engaging said ratchet rack, a rigid pin in said tube projecting through said cap and a spring interposed between said last named valve and said cap.

In testimony whereof I affix my signature in presence of two witnesses.

FRANK MOYLE.

Witnesses:
   Eric J. Segerstrom,
   Rowan Hardin.